April 18, 1950    J. E. REILLY    2,504,878
CONTROL CIRCUIT
Filed Feb. 24, 1947
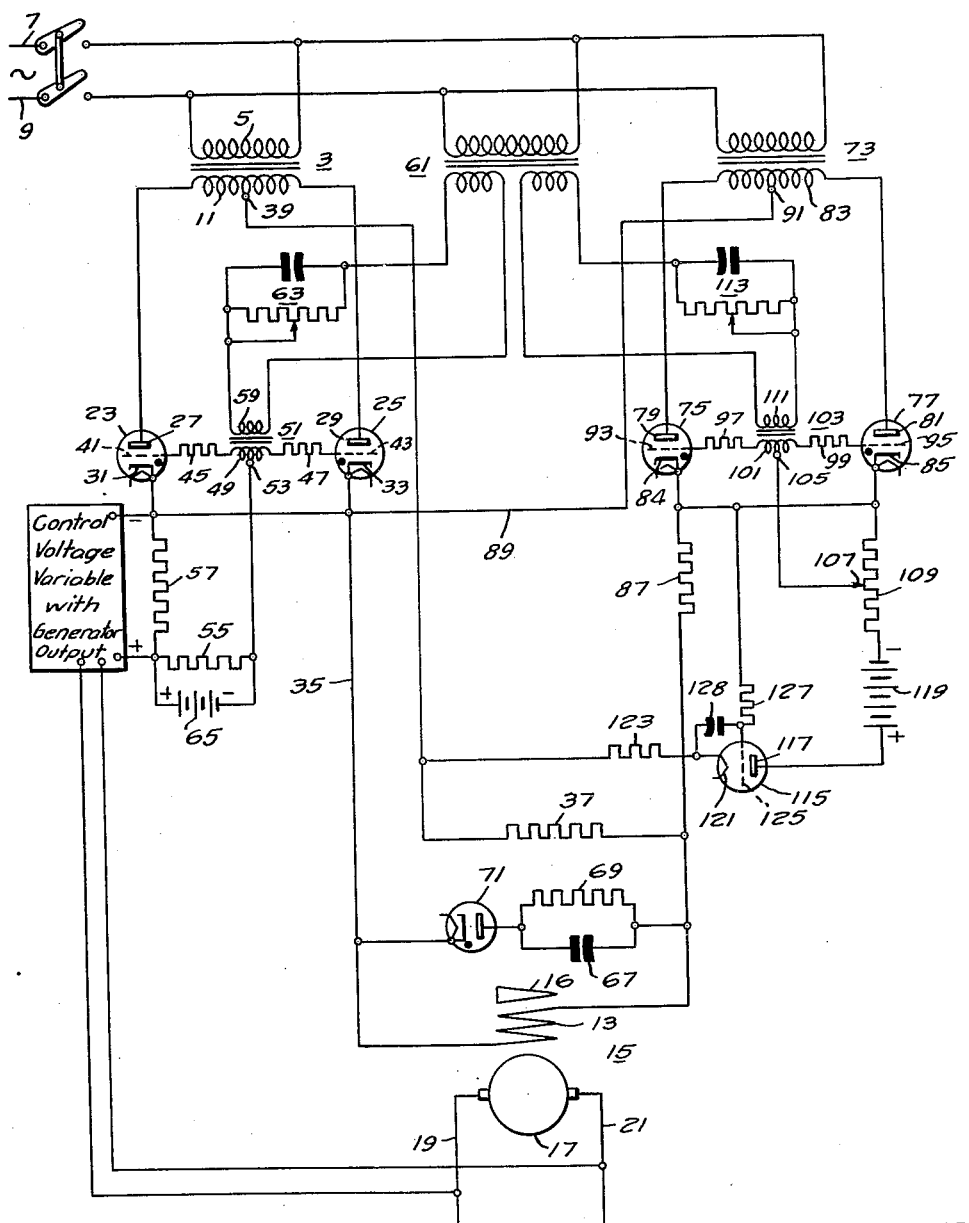
WITNESSES:
INVENTOR
Jack E. Reilly.
BY
ATTORNEY Patented Apr. 18, 1950

2,504,878

UNITED STATES PATENT OFFICE 2,504,878

CONTROL CIRCUIT

Jack E. Reilly, Pittsburgh, Pa., assignor to Westinghouse Electric Corporation, East Pittsburgh, Pa., a corporation of Pennsylvania Application February 24, 1947, Serial No. 730,381

11 Claims. (Cl. 322—28)

This invention relates to an electronic control circuit and it has particular relation to a control for use in supplying energy from an alternating voltage source to an inductive load, such as the field winding of a direct current motor or of a generator.

In the regulation by field control of motors and generators, it is highly desirable to provide what is known as field forcing. By field forcing is meant a rapid increasing or decreasing of the current through the field winding to effect a rapid change in the field to change the speed of the armature of the motor or the output voltage of the generator as the case might be.

According to the copending application of S. L. Burgwin, Serial No. 614,945, filed September 7, 1945, the field winding of a motor is energized from an alternating voltage source through electric valve means of the arc-like type, such as thyratrons. The valve means is connected to act as a rectifier and is rendered conductive in each half-period of the alternating supply voltage to supply pulsating unidirectional current through the field winding. The average voltage applied to the field winding may be controlled by varying the instant in a half-period at which the valve means becomes conductive, which instant is hereinafter designated as the ignition point. If the ignition point is suddenly advanced, as for regulating purposes, a corresponding rapid advance in the average voltage applied to the field winding is effected to strengthen the field rapidly. However, as pointed out in the said copending application, a delay in the ignition point ordinarily would not produce a rapid weakening of the field. The field would be weakened but the action would be comparatively slow because of the energy stored in the field. The delay in the ignition point tends to space the pulses of applied voltage farther apart. However, when the applied voltage drops, as at the end of a half-period of the supply voltage, the magnetic energy previously stored in the field generates a voltage tending to maintain the current through the field winding at its previous level. As a result, the valve means tends to continue to conduct current until the stored energy is substantially dissipated, which, because of the low impedance of the supply circuit requires a relatively long time. Consequently, a delay in the ignition point does not of itself cause a rapid weakening of the field.

To reduce the time required for decreasing the current through the field winding, there is disclosed in the copending Burgwin application an arrangement in which a capacitor having a resistor in shunt therewith is connected in parallel circuit relation with the field winding and is effective to cause a rapid rate of change of current through the field winding when the applied voltage decreases. A rectifier is preferably employed in connecting the shunt resistor and capacitor in parallel circuit relation with the field winding, the rectifier being connected to conduct current only in a direction opposite to that which tends to flow by reason of the applied voltage. The rectifier serves to prevent oscillations between the field winding and capacitor.

The arrangement provided by Burgwin operates quite satisfactorily with most inductive load. However, with certain loads it has been found that if the regulation causes the applied voltage to be removed, a capacitor and resistor circuit as disclosed by Burgwin is effective to take out most of the energy stored in the field but the remainder is dissipated quite slowly. Such a load, for example, is a field winding for a generator with additional damper windings, i. e., short circuited turns, on the pole. With such an arrangement, the energy which is not rapidly removed from the field is too great to permit a high degree of field forcing.

It is, accordingly, an object of my invention to provide a new and improved control system for supplying an inductive load.

Another object of my invention is to provide a new and improved control system for regulating the field of a generator or motor in which the field winding is energized with pulsating unidirectional current.

A further object of my invention is to provide a new and improved control system for regulating the field of a generator or motor in which the field winding is energized with a unidirectional current derived from an alternating voltage source through valve means of the arc-like type.

Still another object of my invention is to provide a new and improved control system for supplying an inductive load with unidirectional current in which a rapid rate of change of current through the load is provided in response to changes in the voltage applied thereto.

In accordance with my invention, I provide an arrangement in which a rapid change of current through the field winding is effected when the applied voltage is removed by means of a combination of a capacitor with a shunt resistor in parallel circuit relation with the field winding and means for applying a reverse voltage to the field winding. The reverse voltage is preferably of a considerably lower magnitude than the forward applied voltage and is to be applied to the field winding through valve means which become conductive when field winding current in a forward direction drops below a predetermined value. The arrangement is such that when the regulating control voltage causes the applied forward voltage to be blocked or removed, the capacitor and resistor produce an initial rapid decrease in field winding current and when the current drops to a predetermined value, the reverse voltage is applied to dissipate the remaining stored energy. Thus a high degree of field forcing may be effected even with damper windings on the pole.

The features of my invention which I consider novel are set forth with more particularity in the appended claims. The invention itself, however, together with additional objects and advantages thereof may be better understood from the following description of a specific embodiment when read in connection with the accompanying drawing, in which the single figure is a schematic circuit diagram of a generator voltage regulating system embodying my invention.

As shown in the drawing, a main supply transformer 3 has a primary winding 5 energized from alternating voltage supply lines 7 and 9. The secondary winding 11 of the transformer 3 is arranged to supply current through the field winding 13 of a generator 15, with damper windings 16 also provided on the pole (not shown). The armature 17 of the generator may be driven by a suitable source of power to generate a voltage across a pair of output leads 19 and 21.

A pair of main electric discharge valves 23 and 25 of the arc-like type, preferably thyratrons, are interposed between the secondary winding 11 of the supply transformer 3 and the field winding 13 of the generator 15. The anodes 27 and 29 of the main valves 23 and 25 are connected to opposite ends respectively of the secondary winding 11. The cathodes 31 and 33 of the main valves 23 and 25 are connected together and through a conductor 35 to one end of the field winding 13, the other end of which is connected through a resistor 37 to an intermediate tap 39 on the secondary winding 11.

The control grids 41 and 43 of the main valves 23 and 25 are connected through individual grid resistors 45 and 47 to opposite ends of a secondary winding 49 of a grid transformer 51. The center tap 53 on the secondary winding 49 of the grid transformer 51 is connected through a resistor 55 and another resistor 57 to the cathodes 31 and 33 of the main valves. The primary winding 59 of the grid transformer 51 is energized from the supply lines 7 and 9 through an auxiliary transformer 61 and a phase-shifting circuit 63. The phase-shifting circuit 63 is preferably adjusted so that the alternating voltage appearing across the secondary winding 49 of the grid transformer 51 between the control grid and cathode of each main valve is displaced in phase by approximately 90° with respect to the anode to cathode voltage.

A direct current biasing voltage is impressed across the resistor 55 from a suitable source illustrated as a battery 65. A direct current voltage of opposite polarity appears across the resistor 57 and is supplied from a suitable source of control voltage which is variable with the output of the generator for regulating purposes.

The resultant grid to cathode voltage for each of the main valves 23 and 25 is made up of a direct current component of the algebraic sum of the biasing voltage on resistor 55 and the control voltage on resistor 57 and an alternating voltage component from transformer 61. Each main valve, of course, is rendered conductive in a half-period of the supply voltage in which its anode is positive, at the instant the resultant grid to cathode voltage becomes more positive than the critical value of the valve. The voltage values are arranged so that with an increase in the control voltage the ignition point of each valve is advanced and with a decrease in the control voltage the ignition point is delayed.

The main valves 23 and 25 are then rendered conductive alternately in successive half-periods of opposite polarity of the alternating supply voltage with the ignition point determined by the magnitude of the control voltage. Current then flows from the secondary winding 11 of the supply transformer 3 through the main valves 23 and 25 alternately, the field winding 13 and the resistor 37 to the center tap 39 of the secondary winding. Thus, pulsating unidirectional current is supplied in what might be termed the forward direction through the field winding 13, and the average magnitude of that current depends upon the ignition points of the main valves.

While I have shown a particular arrangement for delaying or advancing the ignition points of the valves, the arrangement is only illustrative and any of the other well-known arrangements for varying the ignition points with variation in a control voltage may be employed. By many of these known arrangements the ignition points may be varied over substantially a complete half-period.

To enable a rapid increase in the field winding current, the voltage across the secondary winding 11 of the supply transformer 3 is arranged to be several times greater than the normal voltage to be applied to the field winding 13. Consequently, in supplying rated current through the field winding 13, the main valves 23 and 25 are not rendered conductive at the beginning of each corresponding half-period of alternating voltage, but their ignition points are delayed somewhat so that the desired lower average voltage is applied. Then, when it is desired to strengthen the field, i. e., to increase the flux, the ignition points may be rapidly advanced to effect a rapid increase in the field winding current by increasing the average applied voltage.

A capacitor 67 having a resistor 69 in shunt therewith is connected in parallel circuit relation with the field winding 13 through a diode rectifier tube 71. As described in the aforesaid copending application of Burgwin, the capacitor 67 and resistor 69 are arranged to cause a rapid rate of change of current through the field winding 13 when the applied voltage decreases. With a decrease in the instantaneous applied voltage, the stored energy in the field generates a voltage across the field winding tending to maintain the current flow therethrough at its previous level. The polarity of this generated voltage is such that the rectifier tube 71 becomes conductive. As the capacitor 67 is then in a discharged state, the immediate voltage across the field winding 13 is limited to the arc drop of the rectifier tube 71. This drop is sufficiently small that the conductive one of the main valves 23 and 25 becomes nonconductive. The capacitor 67 then charges rapidly to dissipate energy previously stored in the field and the shunt resistor 69 acts to limit the maximum voltage appearing across the field winding 13, which may be made several times the normal field voltage. Thus, the previously stored magnetic energy is largely dissipated. However, as previously indicated, the damper windings on the field pole prevent the capacitor 67 and resistor 69 from rapidly dissipating all of the stored energy. Consequently, if the control voltage should cause the main valve to be maintained non-conductive, as might occur with the control voltage provided in accordance with the generator output in a regulation system, the capacitor 67 and resistor 69 causes the current through the field winding to be reduced rapidly to a lower value but some stored energy remains.

To enable rapid dissipation of the remaining stored energy, an auxiliary alternating voltage is provided through an auxiliary transformer 73 energized from the supply lines 7 and 9. An auxiliary pair of electric discharge valves 75 and 77 of the arc-like type, preferably thyratrons, are also provided. The anodes 79 and 81 of the auxiliary valves 75 and 77 are connected to opposite ends of the secondary winding 83 of the auxiliary transformer 73. The cathodes 84 and 85 of the auxiliary valves 75 and 77 are connected together and through a resistor 87 to the end of the field winding 13 more remote from the cathodes 31 and 33 of the main valves 23 and 25. A conductor 89 completes the circuit from the ends of the secondary winding 83 of the auxiliary transformer 73 through the field winding 13 to the center tap 91 of the secondary winding. The control grids 93 and 95 of the auxiliary valves 75 and 77 are connected through corresponding individual grid resistors 97 and 99 to opposite ends of a secondary winding 101 of a second grid transformer 103. The center tap 105 of the secondary winding 101 of the grid transformer 103 is connected to an adjustable tap 107 on a resistor 109, one end of which is connected to the cathodes 84 and 85 of the auxiliary valves 75 and 77.

The primary winding 111 of the second grid transformer 103 is also arranged to be energized from the alternating voltage supply lines 7 and 9 through the auxiliary transformer 61 and another phase-shifting circuit 113. The phase-shifting circuit 113 is adjusted so the alternating voltage appearing across the secondary winding 101 of the second grid transformer 103 is displaced in phase relative to the anode to cathode voltage of the auxiliary valves by a preselected amount.

A direct current voltage is produced across the resistor 109 under the control of an amplifier tube 115. The anode 117 of the amplifier tube 115 is connected to the positive terminal of a source of direct current voltage, illustrated as a battery 119. The cathode 121 of the amplifier tube 115 is connected through a resistor 123 to the end of the resistor 37 in the main current supply circuit which is most remote from the field winding 13. A connection from the end of the resistor 109 remote from the cathodes 83 and 85 of the auxiliary valves 75 and 77 to the negative terminal of the voltage source 119 completes the circuit from the positive terminal of the source 119 through the amplifier tube 115 and the resistors 123, 37, 87 and 109 to the negative terminal.

The control circuit of the amplifier tube 115 may be traced from the control grid 125 thereof through a grid resistor 127 and the resistors 87, 123 and 37 to the cathode 121. It follows that the current through the amplifier tube 115 is varied in accordance with the voltage across the resistor 37 which is a measure of the forward current supplied through the field winding 13 from the supply transformer 3. A corresponding voltage is produced across the portion of the resistor 109 between the cathodes 84 and 85 and control electrodes 93 and 95 of the auxiliary valves 75 and 77 which varies with the forward current through the field winding 13. A capacitor 128 is also connected between the control electrode 125 and cathode 121 of the amplifier tube 115.

The auxiliary valves 75 and 77 are normally maintained non-conductive. However, when the average forward current through the field winding 13 and therefore the voltage on resistor 37 drops below a predetermined value, the auxiliary valves 75 and 77 are rendered conductive alternately in successive half-periods of opposite polarity. When the auxiliary valves 75 and 77 become conductive, a reverse voltage is applied to the field winding 13 from the auxiliary transformer 73 to cause a rapid dissipation of the remaining energy stored in the field. While the instantaneous voltage across the resistor 37 drops at the end of each half-period of the supply voltage, the smoothing capacitor 128 prevents the amplifier tube from causing the auxiliary valves to become conductive with such drops so that the auxiliary valves become conductive only with a drop in average voltage.

The reverse voltage applied to the field winding is arranged to be considerably less in magnitude than the normal forward applied voltage. Consequently, when the main valves 23 and 25 are again rendered conductive, the forward applied voltage is sufficient to supply a forward current of a magnitude operable through resistor 37 to prevent further conduction of the auxiliary valves 75 and 77.

It is apparent from the foregoing description that field forcing may be readily accomplished. An increase in the control voltage advances the firing point of the main valves 23 and 25 to increase the voltage applied to the field winding and increase the field. A decrease in the control voltage delays the ignition points of the first valves. Because of the action of the capacitor and resistor, a reduction in the applied voltage causes a rapid initial change in current through the field winding, and after the average forward current has dropped below a predetermined value, the reverse voltage is applied through the second valves to continue the rapid decrease in field current.

While I have shown and described a specific embodiment of my invention, I am aware that many other modifications thereof may be made without departing from the spirit of the invention. I, therefore, do not wish to be limited to the specific embodiments disclosed.

I claim as my invention:

1. Apparatus for use with an inductive load comprising means adapted to apply a first voltage of one polarity, the magnitude of which is later to be reduced, across said load to produce a current therethrough, a capacitor, a resistor connected in shunt across said capacitor, said shunt connected capacitor and resistor being connected in parallel circuit relation with said load and effective to cause a rapid initial rate of change of current through said load when the first voltage is reduced, means adapted to function as an auxiliary source of voltage, and means operable when said first voltage is reduced below a predetermined magnitude to connect said auxiliary source to said load to apply a second voltage thereacross of opposite polarity to said first voltage.

2. Apparatus for use with an inductive load comprising means adapted to apply a first voltage of one polarity, the magnitude of which is later to be reduced, across said load to produce a current therethrough, a capacitor, a resistor connected in shunt across said capacitor, means including a rectifier connecting said shunt connected capacitor and resistor in parallel circuit relation with said load, said rectifier being connected to conduct current in a direction opposite to that which tends to flow by application of said first voltage, with said capacitor and resistor effective to cause an initial rapid rate of change of current through said load when the first voltage is reduced, means adapted to function as an auxiliary source of voltage, and means operable when said first voltage is reduced below a predetermined magnitude to connect said auxiliary source to said load to apply a second voltage thereacross of opposite polarity to said first voltage.

3. Apparatus for use with an inductive load comprising means adapted to function as a source of first voltage of one polarity conductively connected across said load to produce current in one direction therethrough, control means for varying said first voltage, means adapted to function as an auxiliary source of voltage, and means responsive to current between said main source and load and effective while that current in said one direction is less than a predetermined value to connect said auxiliary source to said load to apply a second voltage thereacross of opposite polarity to said first voltage.

4. Apparatus for use with an inductive load comprising means adapted to function as a source of first voltage of one polarity conductively connected across said load to produce a current in one direction therethrough, control means for varying said first voltage, a capacitor, a resistor connected in shunt across said capacitor, said shunt connected capacitor and resistor being connected in parallel circuit relation with said load and effective to cause an initial rapid rate of change of current through said load when the first voltage applied across said load is reduced, means adapted to function as an auxiliary source of voltage, and means responsive to current between said main source and load and effective while that current in said one direction is less than a predetermined value to connect said auxiliary source to said load to apply a second voltage thereacross of opposite polarity to said first voltage.

5. Apparatus for use with an inductive load comprising means adapted to function as a source of first voltage of one polarity conductively connected across said load to produce a current in one direction therethrough, control means for varying said first voltage, a capacitor, a resistor connected in shunt across said capacitor, means including a rectifier connecting said shunt connected capacitor and resistor in parallel circuit relation with said load, said rectifier being connected to conduct current only in a direction opposite to that which tends to flow by application of said first voltage, with said capacitor and resistor effective to cause an initial rapid rate of change of current through said load when the first voltage applied across said load is reduced, means adapted to function as an auxiliary source of voltage, and means responsive to current between said main source and load and effective while that current in said one direction is less than a predetermined value to connect said auxiliary source to said load to apply a second voltage thereacross of opposite polarity to said first voltage.

6. Apparatus for use with an inductive load comprising means adapted to function as a main source of alternating voltage, means including first valve means of the arc-like type connecting said main source to said load to supply current therethrough in one direction under the control of said first valve means, control means to render said first valve means conductive in half-periods of said main source, said control means being variable to determine the instant in a half-period at which the first valve means becomes conductive to vary the average voltage applied to said load from said main source, means adapted to function as an auxiliary source of voltage, means including second valve means connecting said auxiliary source to said load to supply current therethrough in the opposite direction under the control of said second valve means, and means responsive to current between said main source and load and effective while the average of that current in said one direction is below a predetermined value to cause said second valve means to be conductive.

7. Apparatus for use with an inductive load comprising means adapted to function as a main source of alternating voltage, means including first valve means of the arc-like type connecting said main source to said load to supply current therethrough in one direction under the control of said first valve means, control means to render said first valve means conductive in half-periods of said main source, said control means being variable to determine the instant in a half-period at which the first valve means becomes conductive to vary the average voltage applied to said load from said main source, a capacitor, a resistor connected in shunt across said capacitor, said shunt connected capacitor and resistor being connected in parallel circuit relation with said load and effective to cause an initial rapid rate of change of current through the load when the instantaneous voltage applied to the load from said main source is reduced, means adapted to function as an auxiliary source of voltage, means including second valve means connecting said auxiliary source to said load to supply current therethrough in the opposite direction under the control of said second valve means, and means responsive to current between said main source and load and effective while the average of that current in said one direction is below a predetermined value to cause said second valve means to be conductive.

8. Apparatus for use with an inductive load comprising means adapted to function as a main source of alternating voltage, means including first valve means of the arc-like type connecting said main source to said load to supply current therethrough in one direction under the control of said first valve means, control means to render said first valve means conductive in half-periods of said main source, said control means being variable to determine the instant in a half-period at which the first valve means becomes conductive to vary the average voltage applied to said load from said main source, a capacitor, a resistor connected in shunt across said capacitor, means including a rectifier connecting said shunt connected capacitor and resistor in parallel circuit relation with said load with the rectifier connected to conduct current only in a direction opposite to that which tends to flow by application of the first voltage, said capacitor and resistor being effective to cause an initial rapid rate of change of current through said load when the instantaneous voltage applied to the load from said main source is reduced, means adapted to function as an auxiliary source of voltage, means including second valve means connecting said auxiliary source to said load to supply current therethrough in the opposite direction under the control of said second valve means, and means responsive to current between said main source and load and effective while the average of that current in said one direction is below a predetermined value to cause said second valve means to be conductive.

9. Apparatus for use with an inductive load comprising means adapted to function as a main source of alternating voltage, circuit means including first valve means of the arc-like type connecting said main source to said load to supply current therethrough in one direction under the control of said first valve means, control means to render said first valve means conductive in half-periods of said main source, said control means being variable to determine the instant in a half-period at which the first valve means becomes conductive to vary the average voltage applied to said load from said main source, a capacitor, a resistor connected in shunt across said capacitor, means including a rectifier connecting said shunt connected capacitor and resistor in parallel circuit relation with said load with the rectifier connected to conduct current only in a direction opposite to that which tends to flow by application of the first voltage, said capacitor and resistor being effective to cause an initial rapid rate of change of current through said load when the instantaneous voltage applied to the load from said main source is reduced, means adapted to function as an auxiliary source of alternating voltage, means including second valve means of the arc-like type connecting said auxiliary source to said load to supply current therethrough in the opposite direction under the control of said second valve means, said circuit means including a second resistor interposed between said main source and load whereby a voltage is developed thereacross proportional to the current flowing between said main source and load, and means responsive to the voltage across said second resistor for rendering said second valve means conductive in each half-period of said auxiliary source voltage while the average voltage across said second resistor is below a predetermined value.

10. Apparatus for use in regulating a rotating electric machine having a field winding and damper windings on the pole thereof, comprising means adapted to function as a source of first voltage of one polarity conductively connected across said field winding to produce current in one direction therethrough, control means responsive to the output of said machine for varying said first voltage accordingly to regulate the machine, a capacitor, a resistor connected in shunt across said capacitor, said shunt connected capacitor and resistor being connected in parallel circuit relation with said field winding and effective to cause an initial rapid rate of change of current through the field winding when the first voltage is reduced, means adapted to function as an auxiliary source of second voltage, controllable circuit means connecting said auxiliary source to said field winding in opposition to said polarity, and control means responsive to current between said source of first voltage and load for controlling said circuit means to apply said second voltage to said field winding only when the average of said current in said one direction is more than a predetermined value.

11. Apparatus for use in regulating a rotating electric machine having a field winding and damper windings on the pole thereof, comprising means adapted to function as a source of first voltage of one polarity conductively connected across said field winding to produce current in one direction therethrough, control means responsive to the output of said machine for varying said first voltage accordingly to regulate the machine, a capacitor, a resistor connected in shunt across said capacitor, means including a rectifier connecting said shunt connected capacitor and resistor across said field winding with said rectifier poled to conduct current only in a direction opposite to that of the current which tends to flow by application of said first voltage, with said capacitor and resistor effective to cause an initial rapid rate of change of current through the field winding when the first voltage is reduced, means adapted to function as an auxiliary source of voltage, and circuit means responsive to current between said main source and load and effective while the average of that current in said one direction is less than a predetermined value to connect said auxiliary source to said field winding to apply a second voltage thereacross of opposite polarity to said first voltage.

JACK E. REILLY.

REFERENCES CITED

The following references are of record in the file of this patent:

UNITED STATES PATENTS

| Number | Name | Date |
| --- | --- | --- |
| 1,913,952 | Powell | June 13, 1933 |
| 2,031,509 | Seeley | Feb. 18, 1937 |
| 2,220,755 | Edwards | Nov. 5, 1940 |